(12) United States Patent
Cho et al.

(10) Patent No.: US 10,300,782 B2
(45) Date of Patent: May 28, 2019

(54) POWER TRANSMISSION APPARATUS FOR A VEHICLE

(71) Applicants: HYUNDAI MOTOR COMPANY, Seoul (KR); KIA MOTORS CORPORATION, Seoul (KR)

(72) Inventors: Wonmin Cho, Hwaseong-si (KR); Seong Wook Hwang, Gunpo-si (KR); Hyun Sik Kwon, Seoul (KR); Ki Tae Kim, Incheon (KR); Jae Chang Kook, Hwaseong-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 40 days.

(21) Appl. No.: 15/829,381

(22) Filed: Dec. 1, 2017

(65) Prior Publication Data

US 2019/0118642 A1   Apr. 25, 2019

(30) Foreign Application Priority Data

Oct. 19, 2017   (KR) .................. 10-2017-0135807

(51) Int. Cl.
*B60K 6/365*   (2007.10)
*B60K 6/547*   (2007.10)
(Continued)

(52) U.S. Cl.
CPC .............. *B60K 6/547* (2013.01); *B60K 6/365* (2013.01); *B60K 6/48* (2013.01); *F16H 3/006* (2013.01);
(Continued)

(58) Field of Classification Search
CPC .. B60K 6/547; B60K 6/48; B60K 2006/4816; B60K 2006/4814; F16H 37/046;
(Continued)

(56) References Cited

U.S. PATENT DOCUMENTS 9,623,744 B2   4/2017   Lee et al.
9,695,919 B2   7/2017   Lee et al.
(Continued)

FOREIGN PATENT DOCUMENTS

JP   4704494   6/2011
KR   10-1338458   12/2013
(Continued)

*Primary Examiner* — Mark J Beauchaine
(74) *Attorney, Agent, or Firm* — Lempia Summerfield Katz LLC (57) ABSTRACT

A power transmission apparatus includes: a planetary gear set configured to output a reduced speed or a same speed as a rotation speed of an engine; a first input shaft selectively connected to an engine output shaft through a first clutch; a second input shaft disposed on the outer circumference of the first input shaft and selectively connected to the engine output shaft through a second clutch; a third input shaft disposed in parallel with the first input shaft; an output shaft disposed in parallel with the first input shaft; an idle shaft disposed in parallel with the first input shaft; and a fixed transmission for selectively shifting torque input according to gear ratios of four speed gear trains. The four speed gear trains are disposed by externally connecting drive gears and driven gears to the first, second, and third input shafts, the output shaft, and the idle shaft.

13 Claims, 4 Drawing Sheets

(51) Int. Cl.
*F16H 3/00* (2006.01)
*F16H 3/093* (2006.01)
*F16H 37/06* (2006.01)
*F16H 3/72* (2006.01)
*F16H 37/04* (2006.01)
*B60K 6/48* (2007.10)
*F16H 3/54* (2006.01)
*F16H 3/08* (2006.01)

(52) U.S. Cl.
CPC ............... *F16H 3/093* (2013.01); *F16H 3/54* (2013.01); *F16H 3/724* (2013.01); *F16H 37/046* (2013.01); *F16H 37/065* (2013.01); *B60K 2006/4816* (2013.01); *B60Y 2200/92* (2013.01); *F16H 2003/0822* (2013.01); *F16H 2200/006* (2013.01); *F16H 2200/0086* (2013.01); *F16H 2200/2005* (2013.01); *F16H 2200/2035* (2013.01); *Y10S 903/91* (2013.01); *Y10S 903/919* (2013.01)

(58) Field of Classification Search
CPC ......... F16H 2037/048; F16H 2037/049; F16H 2037/06; F16H 3/005
See application file for complete search history.

(56) References Cited

U.S. PATENT DOCUMENTS

2008/0236917 A1\* 10/2008 Abe ..................... B60K 6/365
180/65.235
2015/0183311 A1 7/2015 Lee et al.
2015/0184732 A1 7/2015 Lee et al.

FOREIGN PATENT DOCUMENTS

| KR | 20150078779 | 7/2015 |
| KR | 10-1588796 | 1/2016 |

\* cited by examiner

| Driving mode | Shift-stage | Engage element | | | | SL1 | | | SL2 | | | SL3 | |
|---|---|---|---|---|---|---|---|---|---|---|---|---|---|
| | | CL1 | CL2 | ECL | BK | D1 | N | D3 | D2 | N | D4 | N | Re |
| Engine mode | REV2 | | △ | ● | | | ● | | | ● | | | ● |
| | REV1 | | △ | | ● | | ● | | | ● | | | ● |
| | N | | | | ● | | ● | | | ● | | ● | |
| | D1 | △ | | | ● | ● | | | | ● | | ● | |
| | D2 | | △ | | ● | | ● | | ● | | | ● | |
| | D3 | △ | | | ● | | | ● | | ● | | ● | |
| | D4 | | △ | | ● | | ● | | | | ● | ● | |
| | D5 | △ | | ● | | ● | | | | ● | | ● | |
| | D6 | | △ | ● | | | ● | | ● | | | ● | |
| | D7 | △ | | ● | | | | ● | | ● | | ● | |
| | D8 | | △ | ● | | | ● | | | | ● | ● | |

△ : Clutch operation     ● : Shift position

| Driving mode | Shift-stage | Engage element | | | | SL1 | | | SL2 | | | SL3 | | MG |
|---|---|---|---|---|---|---|---|---|---|---|---|---|---|---|
| | | CL1 | CL2 | ECL | BK | D1 | N | D3 | D2 | N | D4 | N | Re | |
| Engine mode/ Parallel Mode | REV2 | | △ | ● | | ● | | | ● | | | | ● | □ |
| | REV1 | | △ | | ● | ● | | | ● | | | | ● | □ |
| | N | | | ● | | ● | | | ● | | | ● | | □ |
| | D1 | △ | | | ● | ● | | | ● | | | ● | | □ |
| | D2 | | △ | | ● | ● | | | | ● | | ● | | □ |
| | D3 | △ | | | ● | | | ● | ● | | | ● | | □ |
| | D4 | | △ | | ● | ● | | | | | ● | ● | | □ |
| | D5 | △ | | ● | | ● | | | ● | | | ● | | □ |
| | D6 | | △ | ● | | ● | | | | ● | | ● | | □ |
| | D7 | △ | | ● | | | | ● | ● | | | ● | | □ |
| | D8 | | △ | ● | | ● | | | | | ● | ● | | □ |
| EV mode | REV | | △ | | | ● | | | ● | | | | ● | ■ |
| | EV1 | △ | | | | ● | | | ● | | | ● | | ■ |
| | EV2 | | △ | | | ● | | | | ● | | ● | | ■ |
| | EV3 | △ | | | | | | ● | ● | | | ● | | ■ |
| | EV4 | | △ | | | ● | | | | | ● | ● | | ■ |

△ : Clutch operation     ● : Shift position
■ : Drive only motor (EV)     □ : Torque assist driving

POWER TRANSMISSION APPARATUS FOR A VEHICLE

CROSS-REFERENCE TO RELATED APPLICATION

This application claims priority to and the benefit of Korean Patent Application No. 10-2017-0135807 filed in the Korean Intellectual Property Office on Oct. 19, 2017, the entire contents of which are incorporated herein by reference.

BACKGROUND a) Field of the Disclosure

The present disclosure relates to a power transmission apparatus for a vehicle. More particularly, the present disclosure relates to a power transmission apparatus for a vehicle in which a planetary gear set and three synchronizers are applied to a dual clutch transmission (DCT) to implement a multi-stage fixed shift stage. A motor/generator is additionally disposed to enable starting and traveling in an electric vehicle mode and a parallel hybrid mode.

b) Description of the Related Art

Environment-friendly technology in vehicles is a key technology for the survival of the future vehicle industry. Vehicle makers are dedicated to developing environment-friendly vehicles to meet environment and fuel consumption regulations.

Examples of the future type vehicle technology include an electric vehicle (EV) and a hybrid electric vehicle (HEV), both of which use electric energy. Another example of a future vehicle technology may include a dual clutch transmission (DCT) that improves efficiency and convenience.

The DCT related to the present disclosure has two clutch devices in an automatic transmission. The DCT related to the present disclosure also has a gear train of a basic manual transmission, selectively transmits torque input from an engine to two input shafts using two clutches, and shifts and outputs the torque using the gear train.

A hybrid electric vehicle is a vehicle that uses two or more power sources. These power sources may come in various combinations such as a combination of traditional gasoline engine or diesel engine powered with fossil fuels and a motor/generator running on electrical energy.

In such a hybrid electric vehicle, a motor/generator which provides better low-speed torque is used as the main power source at low speeds. Additionally, an engine, which provides better high-speed torque, is used as the main power source at high speeds.

Accordingly, the hybrid electric vehicle can greatly improve fuel economy and reduce emissions by shutting down the engine powered by fossil fuels in low-speed areas and using the motor/generator.

Also, an example of a transmission that can be applied to the above hybrid electric vehicle includes a dual clutch transmission. The DCT can increase efficiency and allow easier operation by using two clutches in a manual transmission structure.

In other words, the DCT is a transmission in which two clutches operate alternately. One clutch drives odd gears and the other clutch drives even gears to thereby accomplish shifts. This mechanism of driving the odd gears and the even gears alternately to execute gear changes can reduce the loss of torque during gear shifts, which occurs in traditional manual transmissions (MTs) and in automated-manual transmissions (AMTs).

In the DCT, however, the clutches may slip when starting, causing a clutch burnout and high energy loss. The vehicle may also roll backwards too much due to a clutch slip when starting on a hill, which can cause a safety problem. Moreover, the DCT has a larger shift-shock in comparison with automated transmissions because its shift times should be kept down due to the heat capacity of the clutches.

In addition, the DCT requires an effective layout of the motor/generator such as an electrical power source to be used in hybrid electric vehicles.

The above information disclosed in this Background section is only to enhance understanding of the background of the disclosure. Therefore, the Background section may contain information that is not prior art that is already known in this country to a person of ordinary skill in the art.

SUMMARY

The present disclosure is directed to providing a power transmission apparatus for a vehicle. The disclosed power transmission apparatus is capable of implementing a multi-stage fixed shift stage by applying a planetary gear set and three synchronizers to a DCT. The disclosed power transmission apparatus is capable of simplifying an internal structure due to a reduction in the number of parts. The disclosed power transmission apparatus is also capable of improving fuel consumption by minimizing weight. Additionally, the disclosed power transmission apparatus is capable of improving mountability due to a reduction in volume.

Also, an embodiment of the present disclosure provides a power transmission apparatus for a vehicle capable of enabling traveling in an electric vehicle mode and in a parallel hybrid mode by additionally disposing a motor/generator. As a result, fuel consumption is improved.

An embodiment of the present disclosure provides a power transmission apparatus for a vehicle. The power transmission apparatus includes a planetary gear set configured to output reduced speed or same speed of rotation speed of an engine. The power transmission apparatus also includes a first input shaft selectively connected to an engine output shaft through a first clutch, a second input shaft disposed on the outer circumference of the first input shaft without rotational interference and selectively connected to the engine output shaft through a second clutch, and a third input shaft disposed in parallel with the first input shaft. The power transmission apparatus further includes an output shaft disposed in parallel with the first input shaft and an idle shaft disposed in parallel with the first input shaft. The power transmission apparatus also includes a fixed transmission for selectively shifting torque input according to gear ratios of four speed gear trains. The four speed gear trains are disposed by externally connecting drive gears and driven gears to the first, second, and third input shafts, the output shaft, and the idle shaft.

The planetary gear set may be a single-pinion planetary gear set. The planetary gear set may also include a sun gear fixedly connected to the engine output shaft, a planetary carrier selectively connected with the engine output shaft through an engine clutch, and a ring gear selectively connected with a transmission housing.

The power transmission apparatus may further include a motor/generator as a driving assist source.

The motor/generator may include a rotor fixedly connected with the planetary carrier of the planetary gear set.

The four speed gear trains may include a first speed gear train including a first drive gear disposed on the outer circumference of the first input shaft without rotational interference, a second drive gear disposed on the outer circumference of the third input shaft, and a first driven gear fixed to the output shaft and externally geared to the first drive gear and the second drive gear. The four speed gear trains may further include a second speed gear train including a reverse drive gear disposed on the outer circumference of the idle shaft without rotational interference and a second driven gear fixed to the output shaft and externally geared to the reverse drive gear. The four speed gear trains may also include a third speed gear train including a third drive gear disposed on the outer circumference of the first input shaft without rotational interference, a fourth drive gear disposed on the outer circumference of the third input shaft without rotational interference, and a third driven gear fixed to the output shaft and externally geared to the third drive gear and the fourth drive gear. The four speed gear trains may further include a fourth speed gear train including a first power delivery gear fixed to the second input shaft, a second power delivery gear fixed to the third input shaft, and an idle gear fixed to the idle shaft and externally geared to the first power delivery gear and the second power delivery gear.

The power transmission apparatus may further include a first synchronizer configured to selectively connect the first drive gear and the third drive gear to the first input shaft. The power transmission apparatus may also include a second synchronizer configured to selectively connect the second drive gear and the fourth drive gear to the third input shaft. The power transmission apparatus may further include a third synchronizer configured to selectively connect the reverse drive gear to the idle shaft.

A gear ratio of the first drive gear and the first driven gear may be set for achieving a first forward speed and a fifth forward speed. A gear ratio of the second drive gear and the first driven gear may be set for achieving a second forward speed and a sixth forward speed. A gear ratio of the third drive gear and the third driven gear may be set for achieving a third forward speed and a seventh forward speed. A gear ratio of the fourth drive gear and the third driven gear may be set for achieving a fourth forward speed and an eighth forward speed.

An embodiment of the present disclosure provides a power transmission apparatus for a vehicle including a planetary gear set. The planetary gear set for outputting a reduced speed or a same speed of rotation speed of an engine includes a sun gear, a planetary carrier, and a ring gear. The sun gear is fixedly connected to an engine output shaft. The planetary carrier is selectively connected with the engine output shaft. The ring gear is selectively connected with a transmission housing. The power transmission apparatus further includes a first input shaft selectively connected with the engine output shaft through a first clutch, wherein a first and a third drive gear are disposed on the outer circumference of the first input shaft and selectively connected to the first input shaft. The power transmission apparatus also includes a second input shaft disposed on the outer circumference of the first input shaft without rotational interference and selectively connected with the engine output shaft through a second clutch and the second input shaft wherein a first power delivery gear is fixed thereto. The power transmission apparatus also includes a third input shaft disposed in parallel with the first input shaft, wherein a second and a fourth drive gear are disposed on the outer circumference of the third input shaft and selectively connected to the third input shaft, and a second power delivery gear is fixed to the third input shaft. The power transmission apparatus further includes an output shaft disposed in parallel with the first input shaft and the output shaft. First, second, and third driven gears and an output gear are fixed to the output shaft. The power transmission apparatus also includes an idle shaft disposed in parallel with the first input shaft, wherein a reverse drive gear is disposed on the outer circumference of the idle shaft, and wherein an idle gear is fixed thereto. The power transmission apparatus further includes a fixed transmission comprising a first speed gear train, a second speed gear train, a third speed gear train, and a fourth speed gear train. The first speed gear train includes a first drive gear, a second drive gear, and a first driven gear externally geared to the first drive gear and the second drive gear. The second speed gear train includes a reverse drive gear and a second driven externally geared to the reverse drive gear. The third speed gear train includes a third drive gear, a fourth drive gear, and a third driven gear externally geared to the third drive gear and the fourth drive gear. The fourth speed gear train includes a first power delivery gear, a second power delivery gear, and an idle gear externally geared to the first power delivery gear and the second power delivery gear.

The power transmission apparatus may further include a motor/generator as a driving assist source.

The motor/generator may include a rotor fixedly connected with the planetary carrier of the planetary gear set.

The first speed gear train may include the first drive gear disposed on the outer circumference of the first input shaft without rotational interference, the second drive gear disposed on the outer circumference of the third input shaft, and the first driven gear fixed to the output shaft and externally geared to the first drive gear and the second drive gear. The second speed gear train may include the reverse drive gear disposed on the outer circumference of the idle shaft without rotational interference and the second driven gear fixed to the output shaft and externally geared to the reverse drive gear. The third speed gear train may include the third drive gear disposed on the outer circumference of the first input shaft without rotational interference, the fourth drive gear disposed on the outer circumference of the third input shaft without rotational interference, and the third driven gear fixed to the output shaft and externally geared to the third drive gear and the fourth drive gear. The fourth speed gear train may include the first power delivery gear fixed to the second input shaft, the second power delivery gear fixed to the third input shaft, and the idle gear fixed to the idle shaft and externally geared to the first power delivery gear and the second power delivery gear.

The power transmission apparatus may further include a first synchronizer configured to selectively connect the first drive gear and the third drive gear to the first input shaft. The power transmission apparatus may also include a second synchronizer configured to selectively connect the second drive gear and the fourth drive gear to the third input shaft. The power transmission apparatus may further include a third synchronizer configured to selectively connect the reverse drive gear to the idle shaft.

A gear ratio of the first drive gear and the first driven gear may be set for achieving a first forward speed and a fifth forward speed. A gear ratio of the second drive gear and the first driven gear may be set for achieving a second forward speed and a sixth forward speed. A gear ratio of the third drive gear and the third driven gear may be set for achieving a third forward speed and a seventh forward speed. A gear ratio of the fourth drive gear and the third driven gear may be set for achieving a fourth forward speed and an eighth forward speed.

The power transmission apparatus for a vehicle according to the first embodiment of the present disclosure may achieve eight forward speed stages and two reverse speed stages by applying a planetary gear set and three synchronizers. The disclosed power transmission apparatus is capable of simplifying an internal configuration. The disclosed power transmission apparatus is also capable of minimizing weight to improve mountability and fuel consumption.

Further, the power transmission apparatus for a vehicle according to the second embodiment of the present disclosure enables a vehicle to be operated in an engine mode, a parallel hybrid mode, and an electric vehicle mode with multiple speed stages by applying a motor/generator at the rear of an engine.

Other effects that may be obtained or are predicted by embodiments of the present disclosure are explicitly or implicitly described in the detailed description below. In other words, various effects that are predicted according to embodiments of the present disclosure are described in the detailed description below.

DETAILED DESCRIPTION OF THE EMBODIMENTS

The present disclosure is described more fully hereinafter with reference to the accompanying drawings, in which embodiments of the disclosure are shown. As those having ordinary skill in the art would realize, the described embodiments may be modified in various different ways, all without departing from the spirit or scope of the present disclosure.

To more clearly describe embodiments of the present disclosure, parts that are irrelevant to the description may have been omitted. Like reference numerals refer to like or similar constituent elements throughout the specification and drawings.

In the following description, dividing names of components into 'first', 'second' and the like is to differentiate the names because the names of the components are the same as each other. An order thereof is not particularly limited. In the drawings and description, the following symbols are used to identify various elements of the disclosed embodiments, wherein:
i. CL1, CL2 represent first and second clutches;
ii. D1, D2, D3, D4 represent first, second, third, and fourth drive gears;
iii. ECL represents an engine clutch;
iv. G1, G2, G3, G4 represent first, second, third, and fourth speed gear trains;
v. EOS represents an engine output shaft (crankshaft);
vi. FSDG represents a final reduction gear;
vii. IDS represents an idle shaft;
viii. IDG represents an idle gear;
ix. IS1, IS2, IS3 represent first, second, and third input shafts;
x. MG represents a motor/generator;
xi. OG represents an output gear;
xii. OS represents an output shaft;
xiii. P1, P2, P3 represent first, second, and third driven gears;
xiv. PG represents a planetary gear set;
xv. RD represents a reverse drive gear;
xvi. SL1, SL2, SL3 represent first, second, and third synchronizers; and
xvii. TF1, TF2 represent first and second power delivery gear.

Figure 1:
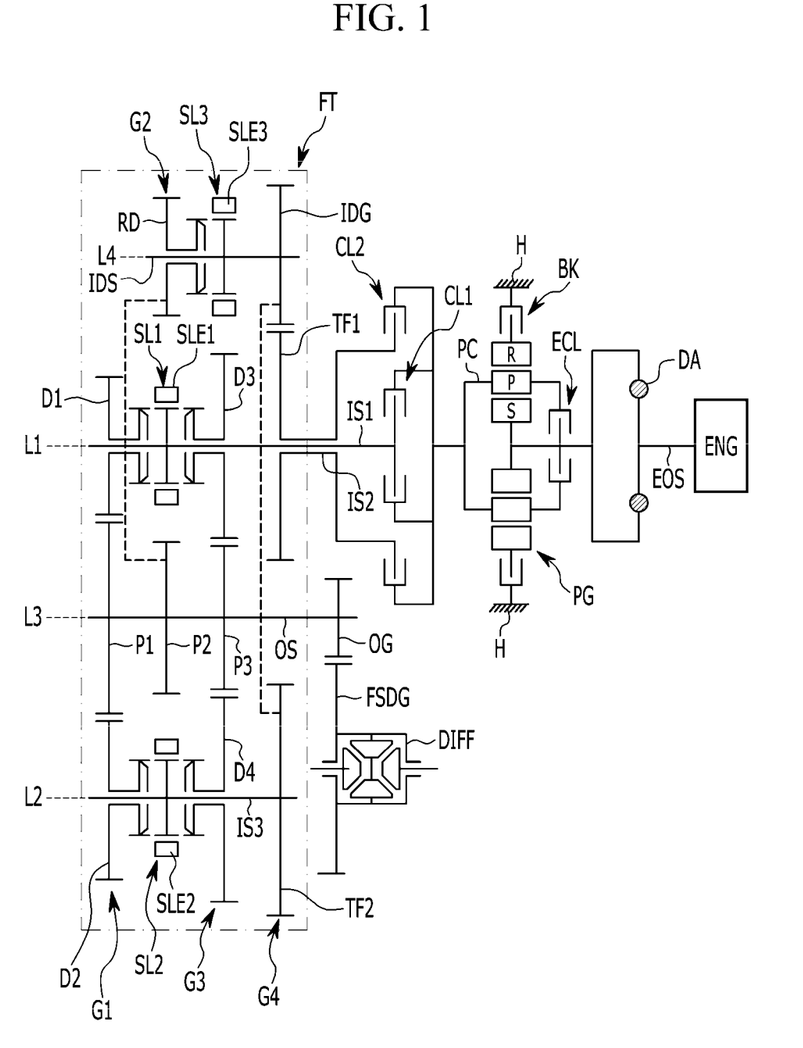
FIG. 1 is a schematic diagram of a power transmission apparatus for a vehicle according to a first embodiment of the present disclosure.

FIG. 1 is a schematic diagram of a power transmission apparatus according to a first embodiment of the present disclosure.

Referring to FIG. 1, a power transmission apparatus for a vehicle according to a first embodiment includes a planetary gear set PG configured to output reduced speed or same speed of rotation speed of an engine ENG, three synchronizers SL1, SL2, and SL3, and a fixed transmission FT realizing 4 forward speeds and one reverse speed.

The engine ENG, which is a power source, may be one of various known engines using a fossil fuel, such as a traditional gasoline engine, diesel engine, or the like.

The fixed transmission FT is disposed on first, second, third, and fourth axis lines L1, L2, L3, and L4, which are placed parallel to each other with a certain distance between them.

The planetary gear set PG and first and second input shafts IS1 and IS2 are disposed on the first axis line L1 from the engine ENG sequentially. A third input shaft IS3 is disposed on the second axis line L2. An output shaft OS is disposed on the third axis line L3 and an idle shaft IDS is disposed on the fourth axis line L4.

The planetary gear set PG disposed on the first axis line L1 is a single-pinion planetary gear set. The planetary gear set PG includes a sun gear S and a planetary carrier PC rotatably supporting a plurality of pinion gears P externally meshing with the sun gear S to allow them to revolve on their own axes and around. The planetary gear set PG further includes a ring gear R internally meshing with the plurality of pinion gears P and connected to the sun gear S.

The sun gear S is fixedly connected to an engine output shaft EOS through a damper DA. The planetary carrier PC is selectively connected with the engine output shaft EOS through an engine clutch ECL. The ring gear R is selectively connected with a transmission housing H interposing a brake BK.

Thus, the sun gear S is always acting as an input element, the ring gear R is acting as a selective fixing element and the planetary carrier PC is always acting as an output element.

When the sun gear S receives torque of the engine ENG and the ring gear R acts as a fixed element by operation of the brake BK, the planetary carrier PC outputs reduced speed. When the sun gear S receives torque of the engine ENG and the engine clutch ECL is operated, the planetary gear set PG rotates integrally and thus the planetary carrier PC outputs the same speed of the sun gear S.

The first input shaft IS1 disposed on the first axis line L1 is selectively connected with the planetary carrier PC of the planetary gear set PG through a first clutch CL1. The first input shaft IS1 transmits torque of the planetary carrier PC to an odd-numbered shift-stage shifting section of the fixed transmission FT.

The second input shaft IS2 disposed on the first axis line L1 is disposed on the outer circumference of the first input shaft IS1 without rotational interference. In other words, the second input shaft IS2 of a hollow shaft is disposed coaxially with and exterior to the first input shaft IS1. Additionally, the second input shaft IS2 is selectively connected with the planetary carrier PC through a second clutch CL2.

The second input shaft IS2 transmits torque of the planetary carrier PC to the idle shaft IDS.

The third input shaft IS3 disposed on the second axis line L2 transmits torque of the second input shaft IS2 transmitted via the idle shaft IDS to an even-numbered shift-stage shifting section of the fixed transmission FT.

The output shaft OS disposed on the third axis line L3 transmits torque from the odd-numbered shift-stage shifting section of the first input shaft IS1 and from the even-numbered shift-stage shifting section of the third input shaft IS3 to a final reduction gear FSDG having a differential DIFF through the output gear OG.

The idle shaft IDS disposed on the fourth axis line L4 transmits torque received from the second input shaft IS2 to the third input shaft IS3.

The fixed transmission FT includes first, second, third, and fourth speed gear trains G1, G2, G3, and G4 disposed on the first, second, and third input shafts IS1, IS2, and IS3 and the idle shaft IDS.

The first, second, third, and fourth speed gear trains G1, G2, G3, and G4 are disposed sequentially at the opposite side of the engine ENG.

The first speed gear train G1 includes a first drive gear D1, a second drive gear D2, and a first driven gear P1. The first drive hear D1 is disposed on the outer circumference of the first input shaft IS1 without rotational interference. The second drive gear D2 is disposed on the outer circumference of the third input shaft IS3. The first driven gear P1 is fixed to the output shaft OS and externally geared to the first drive gear D1 and the second drive gear D2.

The second speed gear train G2 includes a reverse drive gear RD disposed on the outer circumference of the idle shaft IDS without rotational interference. The second speed gar train also includes a second driven gear P2 fixed to the output shaft OS and externally geared to the reverse drive gear RD.

The third speed gear train G3 includes a third drive gear D3, a fourth drive gear D4, and a third driven gear P3. The third drive gear D3 is disposed on the outer circumference of the first input shaft IS1 without rotational interference. The fourth drive gear D4 is disposed on the outer circumference of the third input shaft IS3 without rotational interference. The third driven gear P3 is fixed to the output shaft OS and externally geared to the third drive gear D3 and the fourth drive gear D4.

The fourth speed gear train G4 includes a first power delivery gear TF1 fixed to the second input shaft IS2 and a second power delivery gear TF2 fixed to the third input shaft IS3. The fourth speed gear train G4 further includes an idle gear IDG fixed to the idle shaft IDS and externally geared to the first power delivery gear TF1 and the second power delivery gear TF2.

A first synchronizer SL1 is configured to selectively connect the first drive gear D1 and the third drive gear D3 to the first input shaft IS1.

A second synchronizer SL2 is configured to selectively connect the second drive gear D2 and the fourth drive gear D4 to the third input shaft IS3.

A third synchronizer SL3 is configured to selectively connect the reverse drive gear RE to the idle shaft IDS.

Gear ratios of each drive gear and each driven gear of the four speed gear trains G1, G2, G3, and G4 may be different according to the required design conditions. In the embodiment of the present disclosure, a gear ratio of the first drive gear D1 and the first driven gear P1 is set for achieving a first forward speed and a fifth forward speed. A gear ratio of the second drive gear D2 and the first driven gear P1 is set for achieving a second forward speed and a sixth forward speed. A gear ratio of the third drive gear D3 and the third driven gear P3 is set for achieving a third forward speed and a seventh forward speed. A gear ratio of the fourth drive gear D4 and the third driven gear P3 is set for achieving a fourth forward speed and an eighth forward speed. A gear ratio of the reverse drive gear RD and the second driven gear P2 is set for two reverse speeds.

Further, a gear ratio of the fourth speed gear train G4 may be set for achieving the same rotational speed of the second and the third input shaft IS2 and IS3, but is not limited thereto. Alternately, the gear ratio of the fourth speed gear train G4 may be set according to the gear ratio of the second drive gear D2 and the first driven gear P1, the gear ratio of the fourth drive gear D4 and the third driven gear P3, and the gear ratio of the reverse drive gear RD and the second driven gear P2.

The first, second, and third synchronizers SL1, SL2, and SL3 may be arranged in a known scheme. The first, second, and third sleeves SLE1, SLE2, and SLE3 applied to the first, second, and third synchronizers SL1, SL2, and SL3 may be operated by actuators (not shown) that may be controlled by a transmission control unit.

In the above example, the first and second clutches CL1 and CL2, the engine clutch ECL, and the brake BK are hydraulic pressure friction coupling units operated by hydraulic pressure supplied from a hydraulic pressure control apparatus. Although these friction devices mainly use wet multi-plate hydraulic pressure friction coupling units, they include coupling units that may operate according to an electric signal supplied from an electronic control apparatus such as a dog clutch, an electronic clutch, a magnetic type clutch, and the like.

Figure 2:
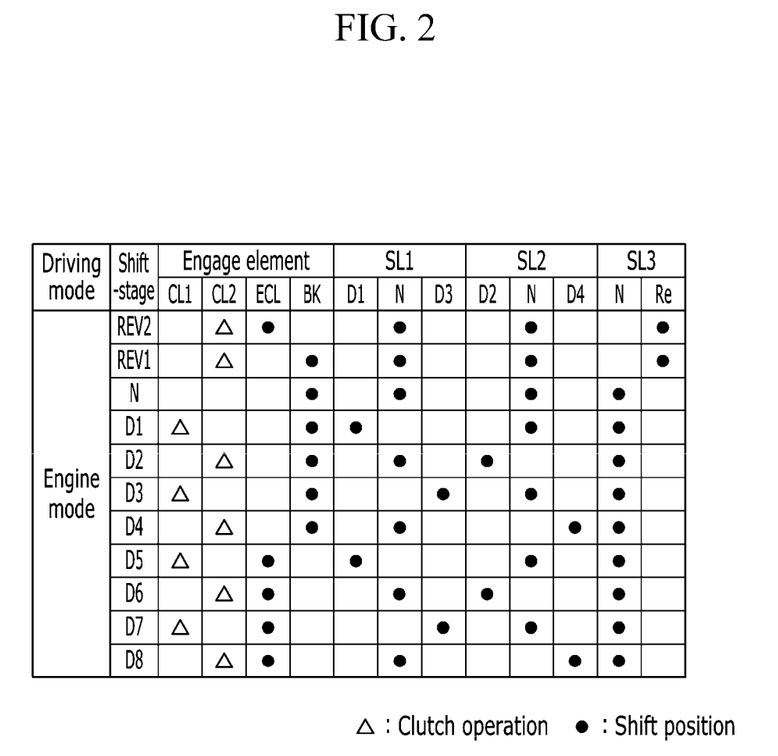
FIG. 2 is a table showing a shift operation of a power transmission apparatus for a vehicle according to the first embodiment of the present disclosure.

FIG. 2 is a table showing a shift operation of a power transmission apparatus according to the first embodiment of the present disclosure. A shifting process is described below.

[First Reverse Speed]

In the first reverse speed REV1, as shown in FIG. 2, the reverse drive gear RD and idle shaft IDS are synchronously connected by the third sleeve SEL3 of the third synchronizer SL3. The second clutch CL2 and the brake BK are also operated.

Accordingly, the rotation speed of the engine ENG transmitted to the planetary gear set PG is reduced due to operation of the brake BK. The torque of the engine ENG is output to the final reduction gear FSDG though the planetary carrier PC, the second input shaft IS2, the first power delivery gear TF1, the idle gear IDG, the idle shaft IDS, the reverse drive gear RD, the second driven gear P2 and the output shaft OS. During the power transmission, rotation is reversed, and thus the first reverse speed is realized.

[Second Reverse Speed]

In the second reverse speed REV2, as shown in FIG. 2, the reverse drive gear RD and the idle shaft IDS are synchronously connected by the third sleeve SEL3 of the third synchronizer SL3. The second clutch CL2 and the engine clutch ECL are also operated.

Accordingly, the rotation speed of the engine ENG transmitted to the planetary gear set PG is output though the planetary carrier PC due to an operation of the engine clutch ECL. The torque of the engine ENG is output to the final reduction gear FSDG though the planetary carrier PC, the second input shaft IS2, the first power delivery gear TF1, the idle gear IDG, the idle shaft IDS, the reverse drive gear RD, the second driven gear P2 and the output shaft OS. During the power transmission, rotation is reversed, and thus the second reverse speed is realized.

[First Forward Speed]

In the first forward speed D1, as shown in FIG. 2, the first drive gear D1 and the first input shaft IS1 are synchronously connected by the sleeve SEL1 of the first synchronizer SL1. The first clutch CL1 and the brake BK are also operated.

Accordingly, the rotation speed of the engine ENG transmitted to the planetary gear set PG is reduced due to operation of the brake BK. The torque of the engine ENG is output to the final reduction gear FSDG though the planetary carrier PC, the first clutch CL1, the first input shaft IS1, the first drive gear D1, the first driven gear P1 and the output shaft OS. Thus, the first forward speed is realized.

[Second Forward Speed]

In the second forward speed D2, as shown in FIG. 2, the second drive gear D2 and the third input shaft IS3 are synchronously connected by the sleeve SEL2 of the second synchronizer SL2. The second clutch CL2 and the brake BK are also operated.

Accordingly, the rotation speed of the engine ENG transmitted to the planetary gear set PG is reduced due to operation of the brake BK. The torque of the engine ENG is output to the final reduction gear FSDG though the planetary carrier PC, the second clutch CL2, the second input shaft IS2, the first power delivery gear TF1, the idle gear IDG, the second power delivery gear TF2, the third input shaft IS3, the second drive gear D2, the first driven gear P1 and the output shaft OS. Thus, the second forward speed is realized.

[Third Forward Speed]

In the third forward speed D3, as shown in FIG. 2, the third drive gear D3 and the first input shaft IS1 are synchronously connected by the sleeve SEL1 of the first synchronizer SL1. The first clutch CL1 and the brake BK are also operated.

Accordingly, the rotation speed of the engine ENG transmitted to the planetary gear set PG is reduced due to operation of the brake BK. The torque of the engine ENG is output to the final reduction gear FSDG though the planetary carrier PC, the first clutch CL1, the first input shaft IS1, the third drive gear D3, the third driven gear P3 and the output shaft OS. Thus, the third forward speed is realized.

[Fourth Forward Speed]

In the fourth forward speed D4, as shown in FIG. 2, the fourth drive gear D4 and the third input shaft IS3 are synchronously connected by the sleeve SEL2 of the second synchronizer SL2. The second clutch CL2 and the brake BK are also operated.

Accordingly, the rotation speed of the engine ENG transmitted to the planetary gear set PG is reduced due to operation of the brake BK. The torque of the engine ENG is output to the final reduction gear FSDG though the planetary carrier PC, the second clutch CL2, the second input shaft IS2, the first power delivery gear TF1, the idle gear IDG, the second power delivery gear TF2, the third input shaft IS3, the fourth drive gear D4, the fourth driven gear P4 and the output shaft OS. Thus, the fourth forward speed is realized.

[Fifth Forward Speed]

In the fifth forward speed D5, as shown in FIG. 2, the first drive gear D1 and the first input shaft IS1 are synchronously connected by the sleeve SEL1 of the first synchronizer SL1. The first clutch CL1 and the engine clutch ECL are also operated.

Accordingly, the rotation speed of the engine ENG transmitted to the planetary gear set PG is output though the planetary carrier PC due to operation of the engine clutch ECL. The torque of the engine ENG is output to the final reduction gear FSDG though the planetary carrier PC, the first clutch CL1, the first input shaft IS1, the first drive gear D1, the first driven gear P1 and the output shaft OS. Thus, the fifth forward speed is realized.

[Sixth Forward Speed]

In the sixth forward speed D6, as shown in FIG. 2, the second drive gear D2 and the third input shaft IS3 are synchronously connected by the sleeve SEL2 of the second synchronizer SL2. The second clutch CL2 and the engine clutch ECL are also operated.

Accordingly, the rotation speed of the engine ENG transmitted to the planetary gear set PG is output though the planetary carrier PC due to operation of the engine clutch ECL. The torque of the engine ENG is output to the final reduction gear FSDG though the planetary carrier PC, the second clutch CL2, the second input shaft IS2, the first power delivery gear TF1, the idle gear IDG, the second power delivery gear TF2, the third input shaft IS3, the second drive gear D2, the first driven gear P1 and the output shaft OS. Thus, the sixth forward speed is realized.

[Seventh Forward Speed]

In the seventh forward speed D7, as shown in FIG. 2, the third drive gear D3 and the first input shaft IS1 are synchronously connected by the sleeve SEL1 of the first synchronizer SL1. The first clutch CL1 and the engine clutch ECL are also operated.

Accordingly, the rotation speed of the engine ENG transmitted to the planetary gear set PG is output though the planetary carrier PC due to operation of the engine clutch ECL. The torque of the engine ENG is output to the final reduction gear FSDG though the planetary carrier PC, the first clutch CL1, the first input shaft IS1, the third drive gear D3, the third driven gear P3 and the output shaft OS. Thus, the seventh forward speed is realized.

[Eighth Forward Speed]

In the eighth forward speed D8, as shown in FIG. 2, the fourth drive gear D4 and the third input shaft IS3 are synchronously connected by the sleeve SEL2 of the second synchronizer SL2. The second clutch CL2 and the engine clutch ECL are also operated.

Accordingly, the rotation speed of the engine ENG transmitted to the planetary gear set PG is output though the planetary carrier PC due to operation of the engine clutch ECL. The torque of the engine ENG is output to the final reduction gear FSDG though the planetary carrier PC, the second clutch CL2, the second input shaft IS2, the first power delivery gear TF1, the idle gear IDG, the second power delivery gear TF2, the third input shaft IS3, the fourth drive gear D4, the fourth driven gear P4 and the output shaft OS. Thus, the eighth forward speed is realized.

In summary, from the first forward speed to the fourth forward speed, the fixed transmission may shift the reduced rotation speed received from the planetary gear set PG to four forward speeds. Additionally, the fixed transmission may shift the same rotation speed received from the planetary gear set PG to four forward speeds from the fifth forward speed to the eighth forward speed and also, the same in reverse speeds. Thus, the power transmission apparatus according to the embodiments of the present disclosure may realize eight forward speeds and two reverse speeds.

Figure 3:
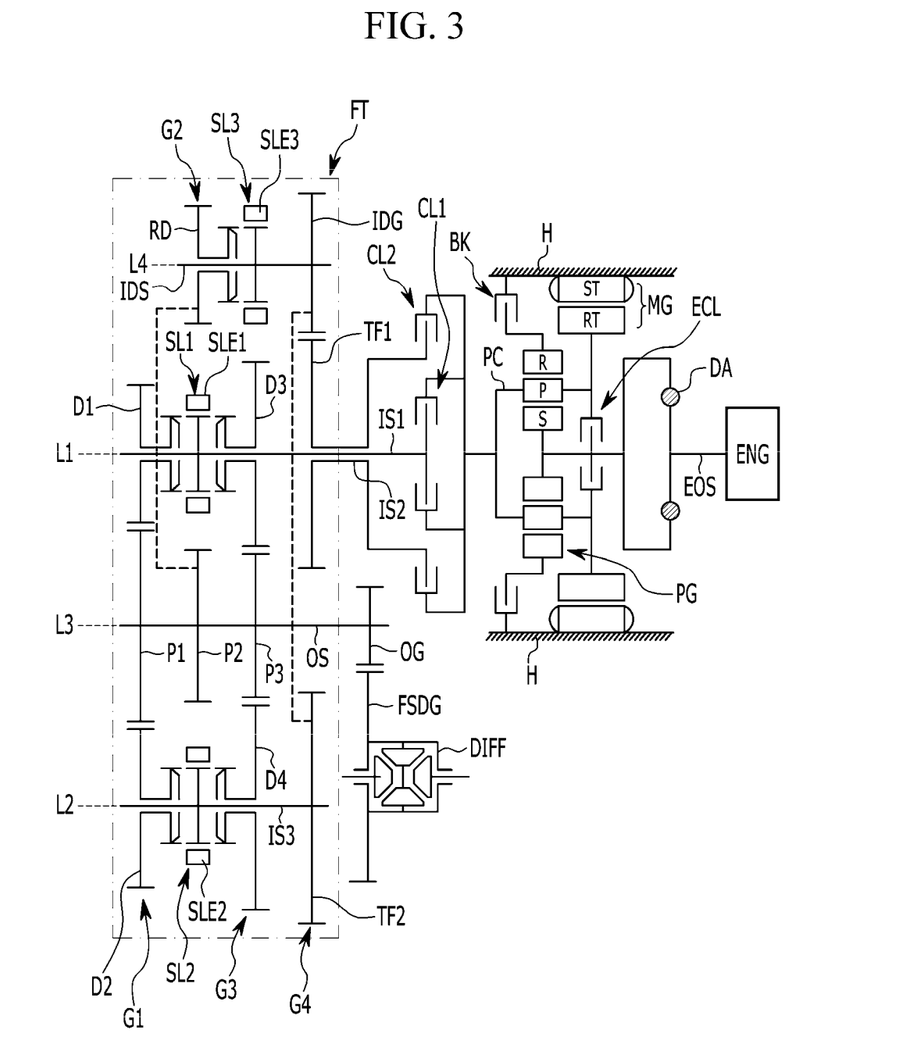
FIG. 3 is a schematic diagram of a power transmission apparatus for a vehicle according to a second embodiment of the present disclosure.

FIG. 3 is a schematic diagram of a power transmission apparatus for a vehicle according to a second embodiment of the present disclosure.

Referring to FIG. 3, in the second embodiment of the present disclosure, the power transmission apparatus includes a motor/generator MG as a driving assist source as well as the elements applied to the power transmission apparatus according to the first embodiment of the present disclosure. Therefore, a parallel hybrid mode and an electric vehicle mode may be realized.

The motor/generator MG may be a device that operates or functions as a motor and a generator. The motor/generator MG may include a stator ST fixed to the transmission housing H and a rotor RT rotatably disposed within the stator ST.

The motor/generator MG is disposed at the rear of the engine ENG and the rotor RT fixedly connected with the planetary carrier PC of the planetary gear set PG.

When the eight forward speeds and two reverse speeds are realized according to the driving torque of the engine ENG, the motor/generator MG may assist torque. Thus, the parallel hybrid mode may be realized.

When the engine clutch ECL is released, the electric vehicle mode EV may be realized by the driving torque of the motor/generator MG.

Figure 4:
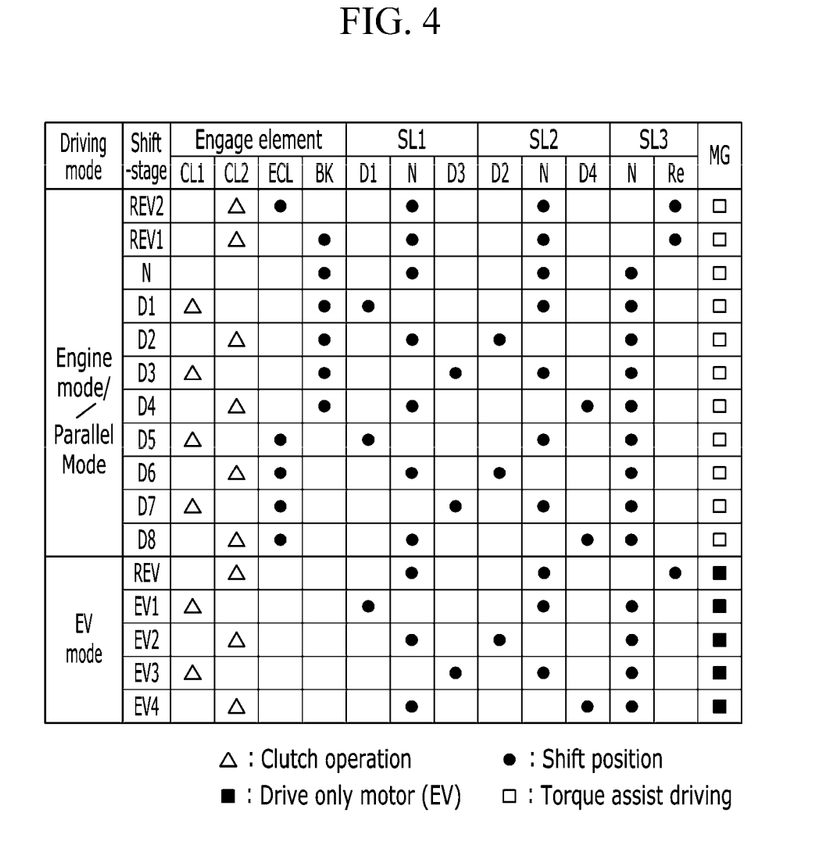
FIG. 4 is a table showing a shift operation of a power transmission apparatus for a vehicle according to the second embodiment of the present disclosure.

FIG. 4 is a table showing a shift operation of the power transmission apparatus for a vehicle according to the second embodiment of the present disclosure. A shifting process is described below.

In the parallel hybrid mode for the power transmission apparatus according to the second embodiment of the present disclosure, the motor/generator MG outputs torque, i.e., provides torque assist to the shift operations for two reverse speeds and eight forward speeds as described above.

In the electric vehicle mode EV, a reverse speed is realized as the same as the first and second reverse speeds of the first embodiment of the present disclosure, except that the engine clutch ECL and the brake BK are not operated because only the driving torque of the motor/generator MG is applied.

In the electric vehicle mode EV, forward speeds from a first electric vehicle forward speed EV1 to a fourth electric vehicle forward speed EV4 are realized as the same as the fifth to eighth forward speeds of the first embodiment of the present disclosure, except that the engine clutch ECL and the brake BK are not operated because only the driving torque of the motor/generator MG is applied.

As described above, the first embodiment of the present disclosure may achieve two reverse speeds and eight forward speeds by adding one planetary gear set to a DCT provided with three synchronizers. Therefore, multiple speed stages are achieved, and fuel economy is improved.

In the second embodiment the present disclosure, the motor/generator MG as a driving assist source is applied. Therefore, the parallel hybrid mode and the electric vehicle mode may be realized, and thus fuel economy is improved.

While this disclosure has been described in connection with what are presently considered to be practical embodiments, those having ordinary skill in the art should understand that the disclosure is not limited to the disclosed embodiments. On the contrary, this disclosure is intended to cover various modifications and equivalent arrangements included within the spirit and scope of the appended claims.

What is claimed is:

1. A power transmission apparatus for a vehicle, the power transmission apparatus comprising:
   a planetary gear set configured to output a reduced speed or a same speed as a rotation speed of an engine;
   a first input shaft selectively connected to an engine output shaft through a first clutch;
   a second input shaft disposed on the outer circumference of the first input shaft without rotational interference and selectively connected to the engine output shaft through a second clutch;
   a third input shaft disposed in parallel with the first input shaft;
   an output shaft disposed in parallel with the first input shaft;
   an idle shaft disposed in parallel with the first input shaft; and
   a fixed transmission for selectively shifting torque input according to gear ratios of four speed gear trains respectively, the four speed gear trains disposed by externally connecting drive gears and driven gears to the first, second, and third input shafts, the output shaft, and the idle shaft.

2. The power transmission apparatus of claim 1, wherein the planetary gear set is a single-pinion planetary gear set, the planetary gear set comprising a sun gear fixedly connected to the engine output shaft, a planetary carrier selectively connected with the engine output shaft through an engine clutch, and a ring gear selectively connected with a transmission housing.

3. The power transmission apparatus of claim 1, further comprising:
   a motor/generator as a driving assist source.

4. The power transmission apparatus of claim 3, wherein the motor/generator comprises a rotor fixedly connected with the planetary carrier of the planetary gear set.

5. The power transmission apparatus of claim 1, wherein the four speed gear trains comprise:
   a first speed gear train including a first drive gear disposed on the outer circumference of the first input shaft without rotational interference, a second drive gear disposed on the outer circumference of the third input shaft, and a first driven gear fixed to the output shaft and externally geared to the first drive gear and the second drive gear;
   a second speed gear train including a reverse drive gear disposed on the outer circumference of the idle shaft without rotational interference and a second driven gear fixed to the output shaft and externally geared to the reverse drive gear;
   a third speed gear train including a third drive gear disposed on the outer circumference of the first input shaft without rotational interference, a fourth drive gear disposed on the outer circumference of the third input shaft without rotational interference, and a third driven gear fixed to the output shaft and externally geared to the third drive gear and the fourth drive gear; and
   a fourth speed gear train including a first power delivery gear fixed to the second input shaft, a second power delivery gear fixed to the third input shaft, and an idle gear fixed to the idle shaft and externally geared to the first power delivery gear and the second power delivery gear.

6. The power transmission apparatus of claim 5, further comprising:

a first synchronizer configured to selectively connect the first drive gear and the third drive gear to the first input shaft;

a second synchronizer configured to selectively connect the second drive gear and the fourth drive gear to the third input shaft; and a third synchronizer configured to selectively connect the reverse drive gear to the idle shaft.

7. The power transmission apparatus of claim 5, wherein:

a gear ratio of the first drive gear and the first driven gear is set for achieving a first forward speed and a fifth forward speed;

a gear ratio of the second drive gear and the first driven gear is set for achieving a second forward speed and a sixth forward speed;

a gear ratio of the third drive gear and the third driven gear is set for achieving a third forward speed and a seventh forward speed; and a gear ratio of the fourth drive gear and the third driven gear is set for achieving a fourth forward speed and a eighth forward speed.

8. A power transmission apparatus for a vehicle, the power transmission apparatus comprising:

a planetary gear set for outputting a reduced speed or a same speed as a rotation speed of an engine, the planetary gear seat including a sun gear, a planetary carrier, and a ring gear, wherein the sun gear is fixedly connected to an engine output shaft, the planetary carrier is selectively connected with the engine output shaft, and the ring gear is selectively connected with a transmission housing;

a first input shaft selectively connected with the engine output shaft through a first clutch, wherein a first and a third drive gear are disposed on the outer circumference of the first input shaft and selectively connected to the first input shaft;

a second input shaft disposed on the outer circumference of the first input shaft without rotational interference and selectively connected with the engine output shaft through a second clutch, wherein a first power delivery gear is fixed to the second input shaft;

a third input shaft disposed in parallel with the first input shaft, wherein a second and a fourth drive gear are disposed on the outer circumference of the third input shaft and selectively connected to the third input shaft, and wherein a second power delivery gear is fixed to the third input shaft;

an output shaft disposed in parallel with the first input shaft wherein first, second, and third driven gears and an output gear are fixed to the output shaft;

an idle shaft disposed in parallel with the first input shaft, wherein a reverse drive gear is disposed on the outer circumference of the idle shaft, and wherein an idle gear is fixed to the idle shaft; and a fixed transmission comprising: a first speed gear train including a first drive gear, a second drive gear, and a first driven gear externally geared to the first drive gear and the second drive gear; a second speed gear train including a reverse drive gear and a second driven externally geared to the reverse drive gear; a third speed gear train including a third drive gear, a fourth drive gear, and a third driven gear externally geared to the third drive gear and the fourth drive gear; and a fourth speed gear train including a first power delivery gear, a second power delivery gear, and an idle gear externally geared to the first power delivery gear and the second power delivery gear.

9. The power transmission apparatus of claim 8, further comprising:

a motor/generator as a driving assist source.

10. The power transmission apparatus of claim 9, wherein the motor/generator comprises a rotor fixedly connected with the planetary carrier of the planetary gear set.

11. The power transmission apparatus of claim 8, wherein:

the first speed gear train comprises the first drive gear disposed on the outer circumference of the first input shaft without rotational interference, the second drive gear disposed on the outer circumference of the third input shaft, and the first driven gear fixed to the output shaft and externally geared to the first drive gear and the second drive gear;

the second speed gear train comprises the reverse drive gear disposed on the outer circumference of the idle shaft without rotational interference and the second driven gear fixed to the output shaft and externally geared to the reverse drive gear;

the third speed gear train comprises the third drive gear disposed on the outer circumference of the first input shaft without rotational interference, the fourth drive gear disposed on the outer circumference of the third input shaft without rotational interference, and the third driven gear fixed to the output shaft and externally geared to the third drive gear and the fourth drive gear; and the fourth speed gear train comprises the first power delivery gear fixed to the second input shaft, the second power delivery gear fixed to the third input shaft, and the idle gear fixed to the idle shaft and externally geared to the first power delivery gear and the second power delivery gear.

12. The power transmission apparatus of claim 11, further comprising:

a first synchronizer configured to selectively connect the first drive gear and the third drive gear to the first input shaft;

a second synchronizer configured to selectively connect the second drive gear and the fourth drive gear to the third input shaft; and a third synchronizer configured to selectively connect the reverse drive gear to the idle shaft.

13. The power transmission apparatus of claim 11, wherein:

a gear ratio of the first drive gear and the first driven gear is set for achieving a first forward speed and a fifth forward speed;

a gear ratio of the second drive gear and the first driven gear is set for achieving a second forward speed and a sixth forward speed;

a gear ratio of the third drive gear and the third driven gear is set for achieving a third forward speed and a seventh forward speed; and a gear ratio of the fourth drive gear and the third driven gear is set for achieving a fourth forward speed and an eighth forward speed.

* * * * *